United States Patent
Kober

(10) Patent No.: US 10,550,906 B2
(45) Date of Patent: Feb. 4, 2020

(54) TUBULAR FILAMENTS SPRING

(71) Applicant: GRAMMER AG, Amberg (DE)

(72) Inventor: Steve Kober, Treuen (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/813,199

(22) Filed: Nov. 15, 2017

(65) Prior Publication Data
US 2018/0142751 A1    May 24, 2018

(30) Foreign Application Priority Data

Nov. 17, 2016    (DE) .................. 10 2016 013 721

(51) Int. Cl.
| | | |
|---|---|---|
| *F16F 1/373* | (2006.01) | |
| *F16F 1/02* | (2006.01) | |
| *B60N 2/844* | (2018.01) | |
| *B60N 2/815* | (2018.01) | |
| *F16F 1/362* | (2006.01) | |
| *B60N 2/80* | (2018.01) | |

(52) U.S. Cl.
CPC ............ *F16F 1/3732* (2013.01); *B60N 2/815* (2018.02); *B60N 2/844* (2018.02); *F16F 1/028* (2013.01); *F16F 1/362* (2013.01); *B60N 2002/899* (2018.02); *F16F 2234/02* (2013.01)

(58) Field of Classification Search
CPC ........ B60N 2002/899; B60N 2002/844; B60N 2002/815; B60N 2/897; F16F 1/028; F16F 1/362; F16F 1/3732; F16F 2234/02; F16F 1/02; F16F 1/36; F04B 9/14
See application file for complete search history.

(56) References Cited

U.S. PATENT DOCUMENTS

| | | | | |
|---|---|---|---|---|
| 1,805,600 A | * | 5/1931 | Ross .................. | F41A 3/78 267/181 |
| 3,321,200 A | * | 5/1967 | Polhemus .............. | B60G 11/28 267/122 |
| 4,380,483 A | * | 4/1983 | Kliger ................ | B29C 53/12 156/169 |
| 5,062,619 A | * | 11/1991 | Sato .................. | F16F 1/02 267/154 |
| 5,788,250 A | * | 8/1998 | Masters ............... | B60N 2/826 297/410 |
| 5,893,867 A | * | 4/1999 | Bagaoisan ............. | A61F 2/958 606/1 |
| 6,612,556 B2 | * | 9/2003 | Petrina ............... | F16F 1/3665 267/168 |
| 6,669,184 B2 | * | 12/2003 | Cai ................... | F16F 1/328 267/162 |
| 7,901,008 B2 | | 3/2011 | Follesa | |

(Continued)

FOREIGN PATENT DOCUMENTS

| | | | | |
|---|---|---|---|---|
| DE | 10233912 A1 | * | 2/2004 | ............ F16F 1/025 |
| JP | 63140139 A | * | 6/1988 | ............ F16F 7/121 |

(Continued)

*Primary Examiner* — Bradley T King
*Assistant Examiner* — Mahbubur Rashid
(74) *Attorney, Agent, or Firm* — Andrew Wilford

(57) ABSTRACT

The invention relates to a spring, in particular to move at least one part of a fixture of the vehicle interior space. It was the object of the invention to create a spring, that does not cause disturbing noises due to vibrations. The object is solved by the spring being made of plastic.

4 Claims, 6 Drawing Sheets

(56) References Cited

U.S. PATENT DOCUMENTS

| | | | |
|---|---|---|---|
| 9,004,602 B2 | 4/2015 | Gottwald | |
| 2002/0121015 A1* | 9/2002 | Petersen | B21D 39/044 29/450 |
| 2002/0142119 A1* | 10/2002 | Seward | A61L 29/126 428/36.9 |
| 2003/0222491 A1 | 12/2003 | Isaacson | |
| 2006/0061188 A1* | 3/2006 | Locke | B60N 2/815 297/410 |
| 2006/0197366 A1* | 9/2006 | Saberan | B60N 2/829 297/410 |
| 2006/0220434 A1* | 10/2006 | Schulz | B60N 2/888 297/410 |
| 2006/0276887 A1* | 12/2006 | Brady | A61F 2/90 623/1.53 |
| 2011/0057369 A1* | 3/2011 | Marquar | F16F 1/025 267/195 |
| 2014/0145563 A1* | 5/2014 | Hamann | H01L 41/0838 310/356 |
| 2014/0339864 A1* | 11/2014 | Mizobata | B60N 2/888 297/216.12 |
| 2016/0097434 A1* | 4/2016 | Russell | F16F 3/0876 267/162 |
| 2016/0160898 A1 | 6/2016 | McElrea | |

FOREIGN PATENT DOCUMENTS

| | | | | |
|---|---|---|---|---|
| JP | 10047400 A | * | 2/1998 | |
| RU | 2011056 C1 | * | 4/1994 | F16F 1/34 |
| WO | WO-2009094793 A1 | * | 8/2009 | F16F 1/028 |

* cited by examiner

TUBULAR FILAMENTS SPRING

FIELD OF THE INVENTION

The invention initially relates to a spring.

BACKGROUND OF THE INVENTION

Such a spring is, for example, known from DE 10 2006 026 029 [U.S. Pat. No. 7,901,008]. A latch can lock or unlock the headrest part of a headrest in different height positions relative to the backrest of a vehicle seat. For the user to unlock it, a button is provided that is spring-loaded by a spring element. When the button is pressed, the spring element is loaded in such a way that restoring forces cause the button to return to its original position as soon as the button is no longer pressed.

In EP 2 608 988 [U.S. Pat. No. 9,004,602], an apparatus is also provided that can lock and unlock a headrest part at various height positions. The headrest has a pushbutton that is returned to its original position by a spring after pressing.

Such springs known from the aforementioned publications are commonly made of metal springs. These have the disadvantage that they vibrate after being pressed or due to shock vibration, when driving on a bumpy road for example, thereby causing undesired buzzing noises.

OBJECT OF THE INVENTION

It is the object of the invention to create a spring that does not generate disturbing noises occur due to vibrations.

Another object is to create a motor-vehicle fixture, in particular a headrest, incorporating a spring but that does not generate the above-cited disadvantageous noises.

SUMMARY OF THE INVENTION

The object was attained in accordance with the in that the spring comprises a first end section and a second end section. The first end section can, for example, be in contact with the first part, which the second end section, for example, can be provided to lie against the second part. In a slackened first position of the spring, the end sections have a first spacing from each other and, a second spacing from one another in at least one loaded second position. The spring is at least partially made of a plastic. More preferably, the spring is completely made of plastic. The spring can be made, for example, by cutting a tubular continuous webbing to length, wherein both end sections are sealed by means of staking, for example, thereby forming a ring structure.

Using the spring according to the invention, no undesired noises occur during functional deformation of the spring or due to shock vibration.

The spring is designed, for example, to be tubular. That means that the spring comprises a wall that is formed like a hollow cylinder and an interior space within the wall. The denseness of the wall is not a crucial factor. Here, the spring characteristic of the wall is significant. The wall has, for example, at least one recess. The recesses can, for example, be formed between a plurality of the spring's filaments.

The spring is designed, for example, as a compression spring or as a tension spring. When removing the second end section or drawing it near with relation to the first end section, the spring is functionally deformed against an elastic restoring force, thereby being loaded. When the force on the spring is eased, the first end section and the second end section return to their original relative position, whereby the spring is slackened.

The spring can, for example, be compressed or extended in the direction of a longitudinal axis. A relatively great level of spring deflection is ensured with this embodiment. When compressing the spring, this may, for example, bulge. If the spring is tubular, the spring bulge in a radial manner, for example, when it is compressed. In the case of an extension, the spring, for example, constricts. A tubular spring constricts, for example, in a radial manner.

The spring comprises at least one filament that extends into the direction of the longitudinal axis of the spring. The filament is, for example, made of plastic. More preferably, the spring comprises a plurality of filaments. The filaments extend, for example, from the first end section of the spring to the second end section. The filaments, can, but do not have to be designed to be parallel to a longitudinal axis of the spring.

For example, at least one filament forms an angle to a longitudinal axis of the spring.

A plurality of filaments form, for example, a webbing. In terms of the invention, webbing means that the filaments have a special arrangement so that they form a compound structure. In terms of the invention, webbing does not mean that the filaments must be arranged at a right angle to one another such as warp and weft threads in a textile webbing.

The webbing has, for example, a first type of filaments and at least a second type of filaments, wherein the first type of filaments are aligned differently with relation to the second type of filaments. The second type of filaments can, for example, form an angle with the first type of filaments.

The spring can, for example, form at least two layers of filaments. The first type of filaments and the second type of filaments are, for example, arranged in different layers. In the case of one level arrangement, these are, for example layers lying on top of one another. In a tubular arrangement, the layers are, for example, arranged consecutively in a radial manner. The spring can, for example, have at least two layers of a first type of filaments and/or a second type of filaments.

The filament is, for example, connected to a ring structure at least one end section. In particular, the filament with a first end section is connected to a first ring structure and with a second end section to a second ring structure. By means of the ring structures, the individual filaments, for example, are connected to each other. For example, other ring structures are arranged between the ring structures at the end segments of the filaments to connect the filaments.

The plastic hose comprises a first end segment and a second end segment. The first end segment and the second end segment have a first spacing from each other in a slackened first position of the plastic hose from each other and a second spacing from each other in at least one loaded second position. In the second position, the plastic hose is, for example, compressed or extended.

The spring formed from the plastic hose does not generate undesired noise in the case of functional deformation nor shock vibration.

The fixture according to the invention comprises a first part and a second part that can be moved in relation to the first part, wherein the second part can be adjusted between a first position and a second position. A spring spring-loads the second part into the first position.

According to the invention, the spring of the fixture is designed according to the invention.

BRIEF DESCRIPTION OF THE DRAWING

Regarding advantages, reference is made to the embodiments concerning the first aspect of the invention.

Other advantages of the invention are revealed through one embodiment depicted in the drawings. The figures show.

SPECIFIC DESCRIPTION OF THE INVENTION

Figure 1:
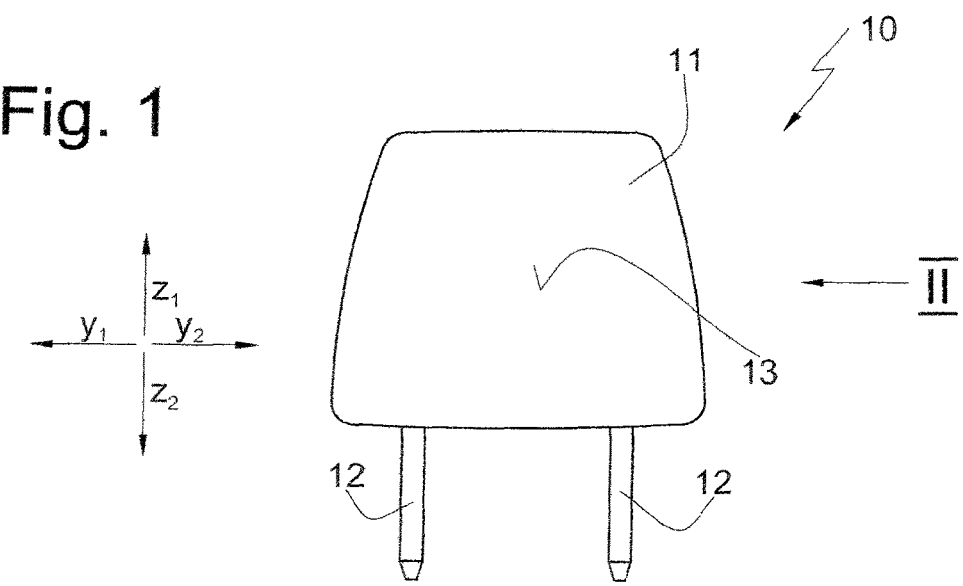
FIG. 1 a front view of a headrest with a head box and with support bars for mounting on a vehicle seat that is not shown, FIG. 2 a view according to view arrow II in FIG. 1, FIG. 3 a cross-section view in accordance with view arrow III-III in FIG. 2, wherein the actuating apparatus is situated in a non-actuated position, FIG. 4 a cross-section view in accordance with cut-out line IV in FIG. 3, FIG. 5 the section following FIG. 5, wherein the actuating apparatus is in the actuated position, FIG. 6 the spring as an individual piece in a slackened position, FIG. 7 the spring as an individual piece in a loaded position, FIG. 8 a cross-section illustration in accordance with (in text) cut-out line VIII-VIII in FIG. 6.

Altogether, a headrest is indicated in the drawings with the reference number 10.

In accordance with FIG. 1, the headrest 10 comprises a head part 11 as well as support bars 12, with which the head part 11 can be supported on the backrest of a vehicle seat that is not shown. A headrest surface 13 is designed on the head part that acts as an abutment for the head of a vehicle passenger.

Figure 2:
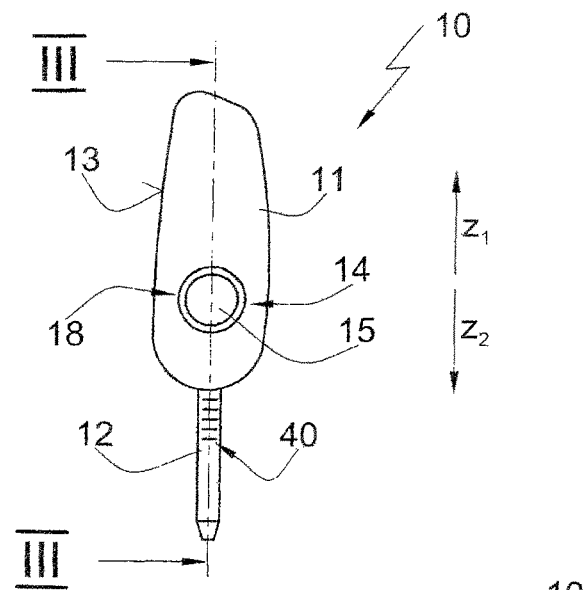

The head part 11 is supported relative to the support bars in the direction $z_1$ and $z_2$ in a moveable manner. By means of a latch 16 (see FIG. 3), the head part 11 can be locked relative to the support bars 12 in various relative positions. In addition, an arrangement of a plurality of notched catches 40 are formed on the support bars 12 (see FIG. 2). In a locked position, a bar assigned to the head part 11 engages in one of the notched catches so that a movement of the head part 11 in one of the directions $z_1$ or $z_2$ or in both directions $z_1$ and $z_2$ is prevented.

Figure 3:
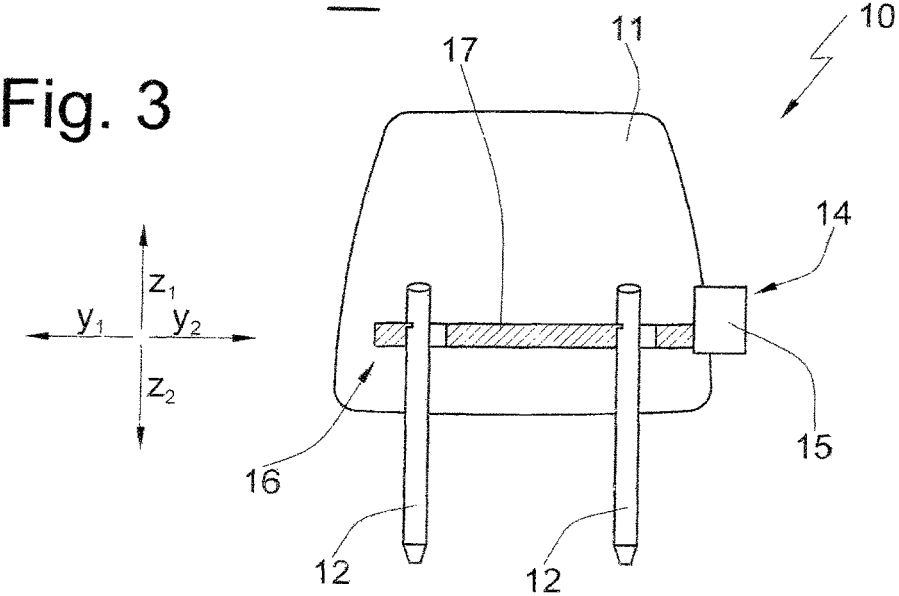

In accordance with FIG. 3, the head part 11 comprises a slider 17 that can be moved into direction $y_1$ and $y_2$. Two bars are assigned to the slider 17, wherein each bar interacts with one of the notched catches 40. In a release position of the latch 16, the bolt is not engaged in one of the notched catches and the head part 11 can be moved into direction $z_1$ or $z_2$.

The latch 16 can be adjusted by means of an actuating apparatus 14 between the locking position and the release position. The actuating apparatus 14 comprises an actuating element 15, for a user being able to adjust the actuating apparatus between a rest position and an actuating position by applying pressure to an actuating surface 28 of the actuating element 15 in the direction $y_1$. The latch 16 can be adjusted in the release position by moving the actuating element 15 out of the rest position in direction $y_1$ into an actuating position. The actuating element 15 is connected to the slider 17 in a moveable manner. The actuating element 15 automatically resets into the rest position in direction $y_2$, which be explained in the following in detail.

Figure 4:
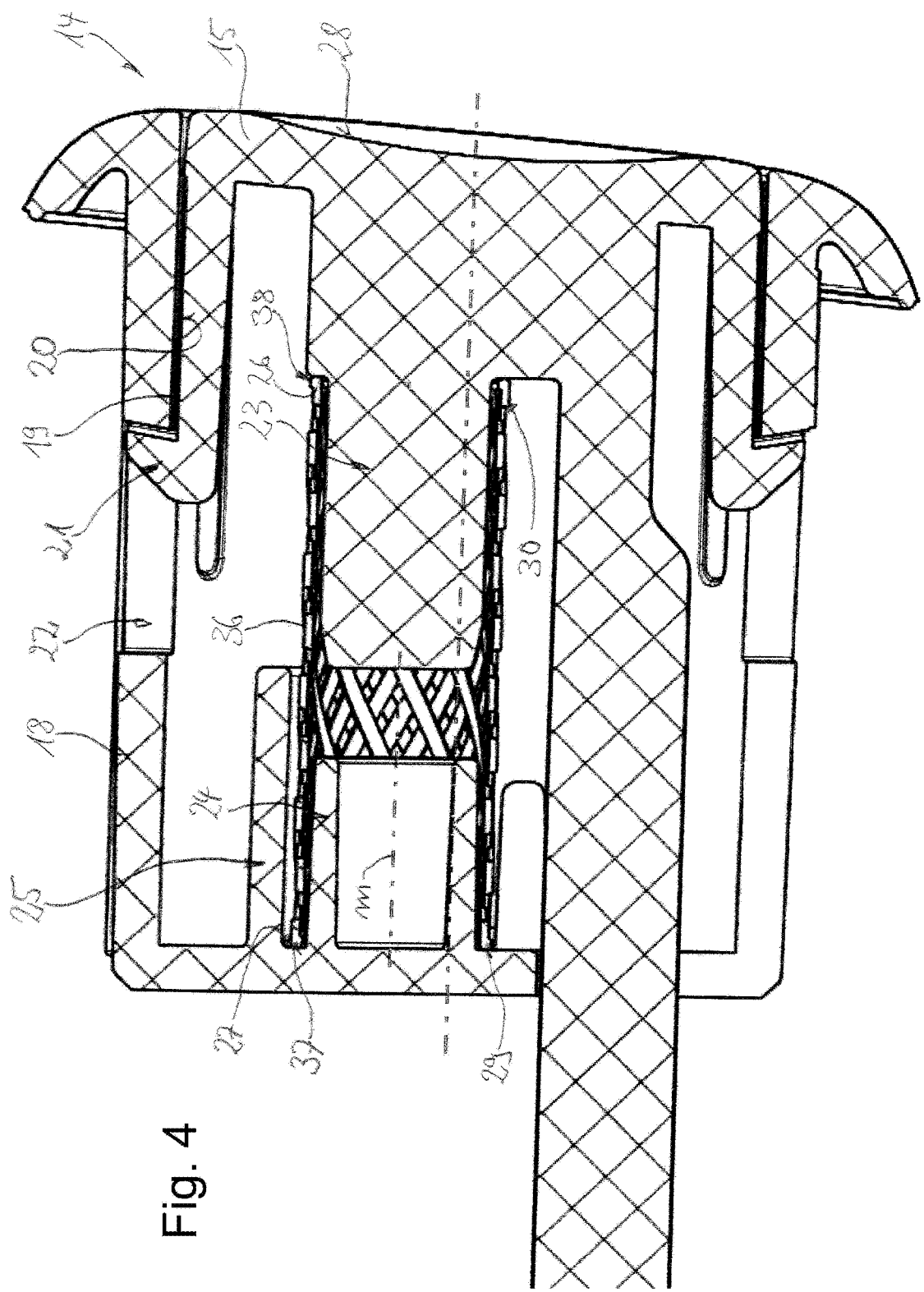

In FIG. 4, the actuating apparatus 14 is shown as an assembly. The actuating apparatus 14 comprises a shell-shaped housing 18 that is permanently attached to the head part 11. The actuating element 15 is lead from the housing 18 during its movement between the rest position and the actuating position. An outer surface 19 of the actuating element 15 slides along an inner surface 20 of the housing 18. A radially protruding hook 21 formed on the actuating element 15 is led through a recess 22 that is formed in the housing 18. The recess 22 has the function of a slotted piece to guide the movement of the actuating element 15 and to limit it.

The actuating element 15 is provided with a seat 23 and the housing 18 is provided with a seat 24. The seat 23 and the seat 24 are facing each other. Both seats 23 and 24 have the shape of a cylindrical protrusion. On the seat 24, a first end section 37 of a spring 36 and on the seat 23, a second end section 38 of the spring 36 is placed.

The first end section 37 surrounds the seat 24 coaxially and is set onto the seat 24 in such a way that a front surface of the end section 37 lies against a floor surface 27. The second end section 38 surrounds the seat 23 coaxially and is set onto the seat 23 to such an extent that a front surface of the end section 38 lies against a shoulder 26.

Figure 5:
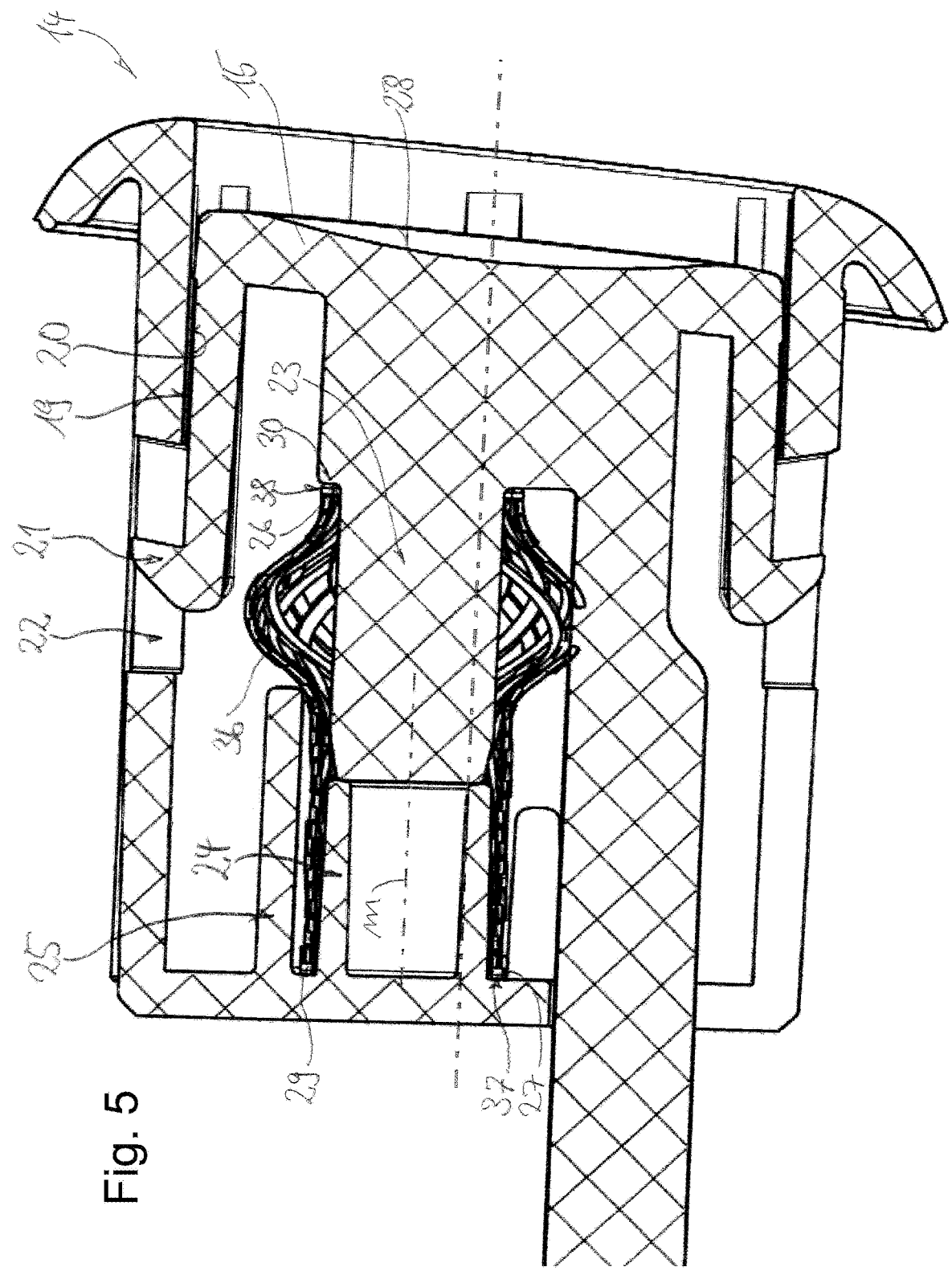

The resting position is shown in FIG. 4 and the actuating position is shown in FIG. 5. In FIGS. 4 and 5, a guide bridge 25 is apparent that limits the elastic deformation of the spring 36 to a definite range.

Figure 6:
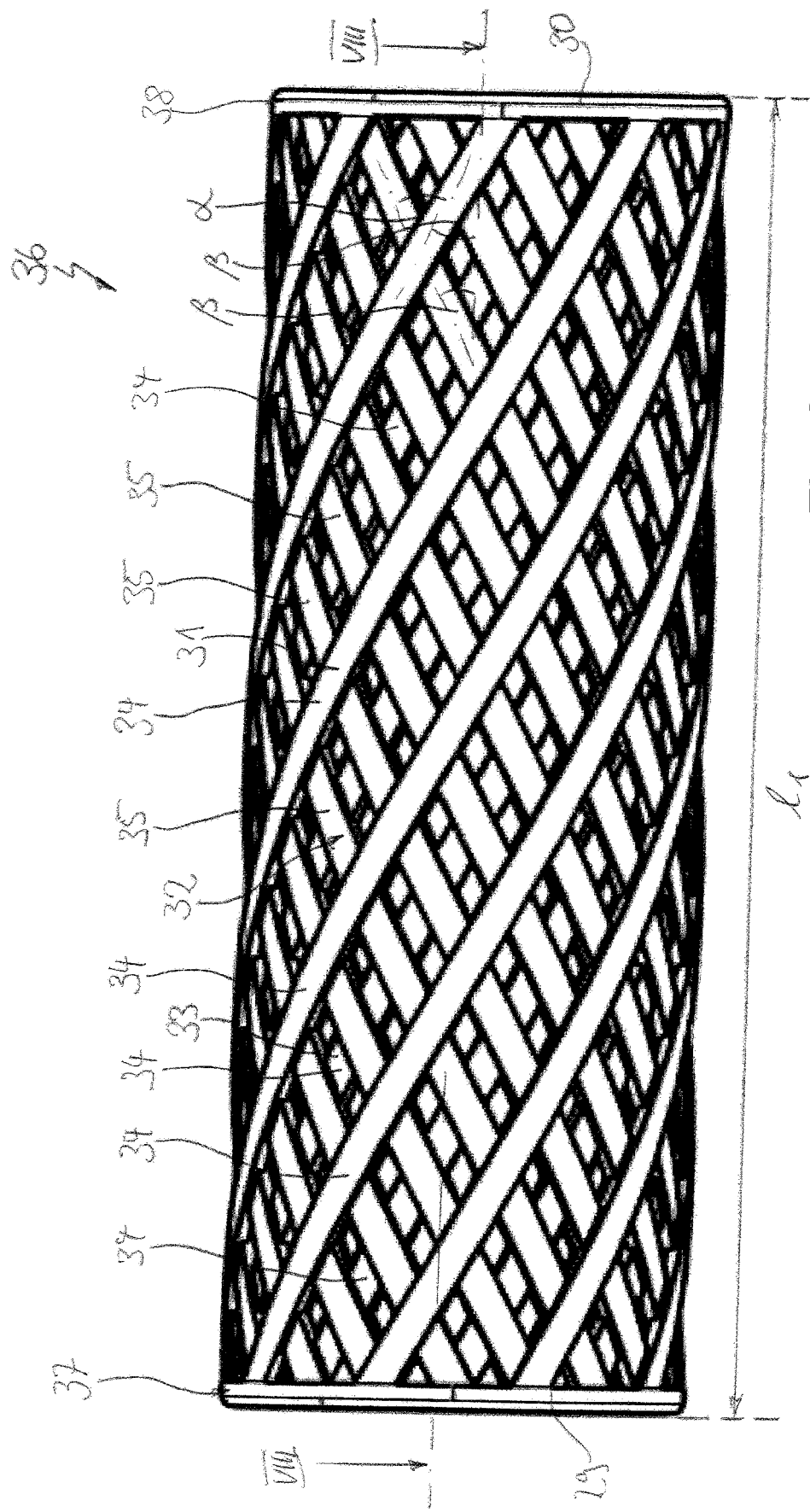

In FIG. 6, the spring 36 is shown as an individual piece. It can be noticed that the spring 36 comprises filaments 34 and 35. The filaments 34 form an angle α with the filaments 35 so that the filaments 34 and 35 cross. Furthermore, the filaments 34 form an angle β to the longitudinal axis m. That means the filaments 34 and 35 are not arranged parallel to the longitudinal axis m.

Altogether, the spring 36 comprises three layers 31, 32 and 33 that are arranged in succession in a radial manner. The outer layer 31 is made of filaments 34; a middle layer 32 is made of filaments 35; and an inner layer 33 is made of filaments 34. All filaments 34 and 35 are permanently connected at an end to a ring structure 29 of the first spring and 37 and an opposite end to a ring structure 30 of the second spring and 38.

In FIG. 6, the spring is shown in the slackened position. The spring 36 assumes the slackened position in the rest position of the actuating apparatus. In accordance with an alternative embodiment, the spring 36 could already be subject to a slight amount of pre-tension in the rest position. In the resting position, the spring 36 has a length 11.

Figure 7:
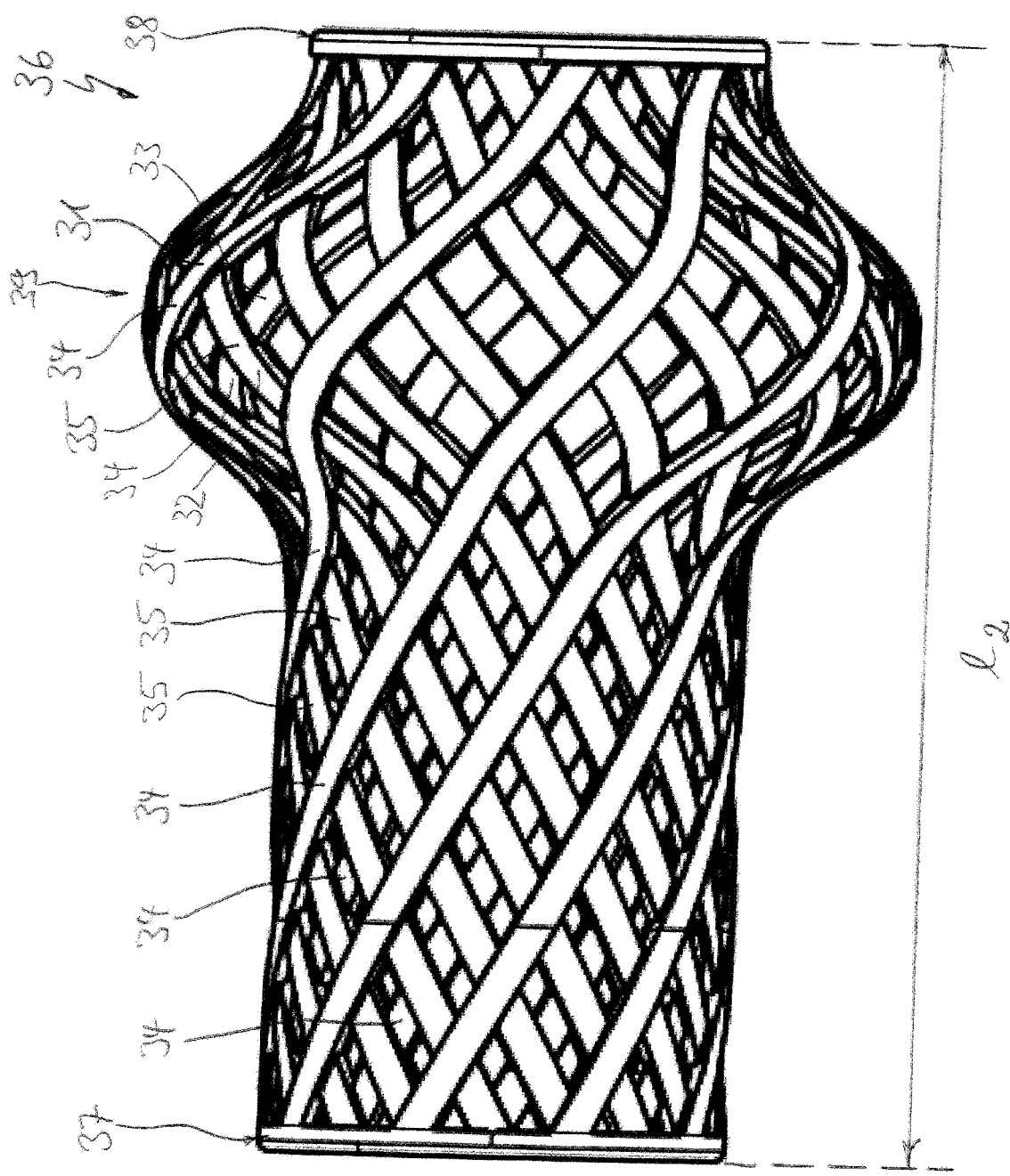

In FIG. 7, the spring is shown in the loaded position. The spring assumes the loaded position in the actuating position of the actuating apparatus 14. In the loaded position, the spring 36 has a length 12. Length 12 is less than length 11 because the spring 36 is compressed in the loaded position in the present embodiment. Due to the compression, the spring 36 forms a ring-shaped bulge 39 that protrudes radially.

Figure 8:
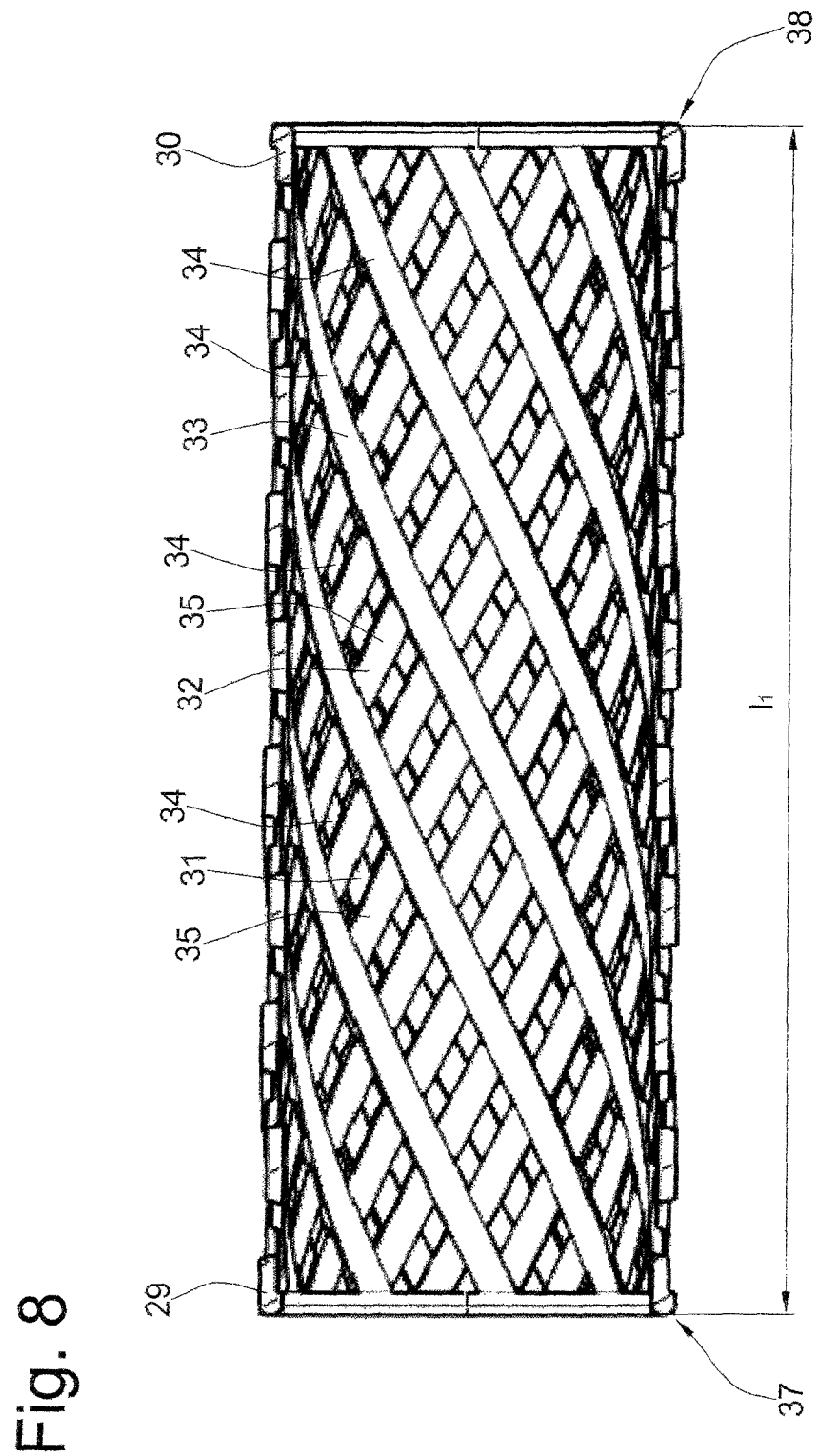

In FIG. 8, a longitudinal view is shown by the spring 36.

Independent of the position, the spring 36 does not cause any noises due to vibrations, as is the case with metal springs for example.

The invention claimed is:

1. A fixture of a vehicle interior space comprising:
a first part;
a second part that can be moved in relation to the first part between a first position and a second position; and a spring that urges the second part into the first position and that comprises a first end ring;

a second end ring; and a tubular wall extending along a longitudinal axis between the rings and formed of first plastic filaments extending at an angle to the longitudinal axis and second plastic filaments also extending at an angle to the axis, and crossing the first filaments, the end rings having a first spacing from each other in a slackened first position of the spring with the tubular wall radially constricted between the rings and a different second spacing shorter than the first spacing from each other in at least one loaded second position with the tubular wall radially bulging between the rings.

2. The fixture according to claim 1, wherein the spring is a compression spring or a tension spring.

3. The fixture according to claim 1, wherein the spring is extensible or compressible in a direction parallel to the longitudinal axis.

4. The fixture according to claim 1, wherein the fixture is a headrest.

\* \* \* \* \*